Nov. 12, 1957

L. R. CRUMP

POWERING ELECTRICAL DEVICES WITH ENERGY ABSTRACTED FROM THE ATMOSPHERE

Filed March 12, 1954

2,813,242

INVENTOR

Lloyd R. Crump

BY W. E. Thibodeau + A. W. Dew

ATTORNEYS

United States Patent Office 2,813,242

Patented Nov. 12, 1957

2,813,242

POWERING ELECTRICAL DEVICES WITH ENERGY ABSTRACTED FROM THE ATMOSPHERE

Lloyd R. Crump, Silver Spring, Md.

Application March 12, 1954, Serial No. 415,986

1 Claim. (Cl. 321—2)

(Granted under Title 35, U. S. Code (1952), sec. 266)

The invention described herein may be manufactured and used by or for the Government for governmental purposes without payment to me of any royalty thereon.

This invention relates to the convenient and economical provision of power for the operation of electronic circuits and devices using transistors, and of other electrical devices having modest power requirements.

A great advantage of transistors, and a major reason for their enthusiastic reception since their introduction a few years ago, is the fact that they will operate satisfactorily with very low supply voltages and currents. One milliwatt or even less is sufficient to power a transistor in many applications. Various batteries have been developed to provide, in a minimum of space, the relatively minute amounts of power needed by transistors.

My invention provides methods and means that permit transistor circuits, and also other low-powered electrical devices, to be economically and conveniently operated without any batteries whatever, and indeed without any power supply whatever as power supplies are ordinarily conceived.

The invention centers around my discovery that it is practicable to construct operative transistor circuits that are able to abstract from the atmosphere sufficient electromagnetic energy to provide all necessary supply voltages and currents for their own operation. Circuits and devices powered according to my invention will operate indefinitely without any local power source whatever.

I have successfully constructed and demonstrated such circuits. For example, I have constructed a batteryless transistor radio receiver on which I have listened to either nearby or distant broadcast stations as desired, using either headphones or a loudspeaker; this receiver has been powered entirely by electromagnetic energy abstracted from the atmosphere.

From the successful operation of this receiver, and from other experimental work, it becomes clear that, by the methods and means of the invention, a great variety of practical and useful transistor circuits can be powered entirely by energy abstracted from the atmosphere.

Furthermore, as will become apparent below, my invention is applicable to the powering of other electrical devices requiring relatively small amounts of power.

An object of the present invention is to provide methods and means for powering transistor circuits entirely from radiofrequency energy abstracted from the atmosphere.

Another object is to provide methods and means for powering remote radio receivers, low-powered radio transmitters, and other low-powered electrical devices, with energy received by radio from a master station, so that no local power supplies are needed by the devices and so that the powering or non-powering of the remote device is under the control of the master station.

A further object is to provide methods and means for powering transistor circuits and other low-powered electrical devices with radiofrequency energy received from one or more remote radio transmitters.

Other objects, aspects, uses, and advantages of the invention will become apparent from the following description and from the drawing.

Figures 1, 3:
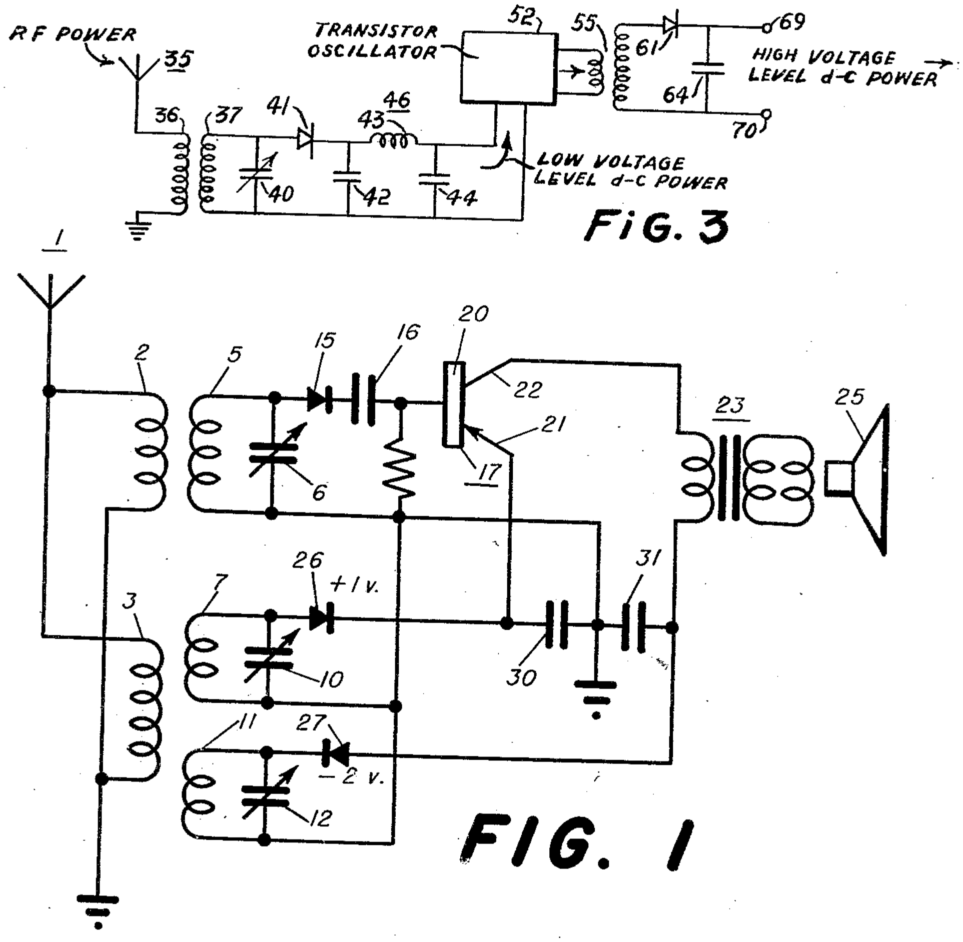
Figure 1 is a schematic diagram of a transistor radio receiver in which all necessary power is supplied by energy abstracted from the atmosphere in accordance with the invention.
Figure 3 is a schematic diagram of a system for obtaining a high energy D.-C. source at a high voltage level using energy abstracted from the atmosphere.

Referring to Figure 1, a receiving antenna 1 is connected to antenna coupling coils 2 and 3, the other ends of which are connected to ground. A parallel resonant circuit consisting of coil 5 and capacitor 6 is coupled to coil 2. A second parallel resonant circuit consisting of coil 7 and capacitor 10 is coupled to coil 3. A third parallel resonant circuit consisting of coil 11 and capacitor 12 is also coupled to coil 3.

Coil 5 and capacitor 6 are tuned to the frequency of a radio transmitter from which it is desired to receive information—for instance, an amplitude-modulated standard broadcast station. The signal received from this transmitter need not be strong. The signal is detected by diode 15 to obtain an audio-frequency information signal. This audio signal is coupled through a capacitor 16 and is amplified by a circuit that includes a transistor 17 having a base 20, an emitter 21, and a collector 22. The amplified audio output of the transistor is coupled through an audio transformer 23 to an electroacoustical transducer, preferably a permanent-magnet dynamic loudspeaker 25 as shown.

The novelty of the invention lies largely in the method and means by which the necessary direct-current power is supplied to the emitter and collector circuits of transistor 17. This method and means will now be described.

Coil 7 and capacitor 10, and also coil 11 and capacitor 12, are tuned to receive radio signals of relatively high strength. It does not matter whether these signals contain information. These power signals are rectified by diodes 26 and 27 to provide direct-current power that is filtered by capacitors 30 and 31. The D.-C. power thus obtained is utilized to power the transistor 17.

In the circuit shown, two tuned circuits (coil 7 and capacitor 10, and coil 11 and capacitor 12) are tuned to power signals and the D.-C. voltages obtained from each are connected in series. The tuned power circuits may be tuned to the same or different power signals. Under certain circumstances it may be desirable to use more than two tuned power circuits and to tune them to more than two power signals; in this way power can be obtained from several signals and combined. On the other hand, if a strong power signal is available, a single tuned power circuit may suffice to give the needed D.-C. power.

Even weak information signals can be received successfully. A plurality of transistor amplifier stages can be used if desired, or other circuits such as superheterodyne circuits can be used. It is merely necessary that a sufficiently strong power signal or signals be available to provide the small amount of D.-C. needed to power the transistors.

If the information signal happens to be strong, it can be used as the power signal; all of the tuned circuits (coil 5 and capacitor 6, coil 7 and capacitor 10, coil 11 and capacitor 12) are tuned to the information signal.

Engineers who have observed my invention in operation have been surprised at the unexpectedly good results obtained, even with readily available power signals of quite moderate strength. For instance, sufficient power for satisfactory operation of a loudspeaker at low volumes is readily obtained from a 5-kilowatt standard broadcast station 5 miles away, using only an indoor antenna to pick up the power signal as well as information signals. In typical operation under these conditions a D.-C. voltage of about 2.5 to 3 volts is obtained between the emitter and the collector, at a current of about 250 microamperes; D.-C. power input to the transistor is thus of the order of 0.5 to 1 milliwatt. So far as I am aware, no one has ever before discovered and demonstrated the practicability of this method of powering a radio receiver.

Because existing broadcast stations within a radius of a number of miles provide adequate power signals, the invention is readily practicable with existing power signals in almost any location in or near any city in the United States.

Although I have described a transistor radio receiver powered by my invention, it will be readily apparent that the invention is applicable to the powering of any transistor circuit using one or a number of transistors, and to the powering of other devices requiring relatively small amounts of power. For instance, sensitive electromechanical, electrochemical, or electrothermal devices can be operated by the method of the invention.

Figure 2:
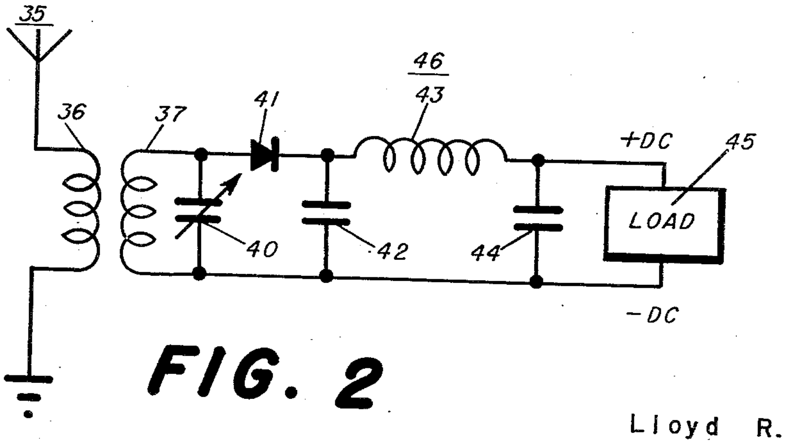
Figure 2 is a schematic diagram showing a general application of the invention to provide direct-current power to a load.

Referring to Figure 2, which shows a more general embodiment of my invention, an antenna 35 picks up radiofrequency energy from the atmosphere. This energy flows through coil 36, which is coupled to a tuned circuit consisting of coil 37 and capacitor 40. The radiofrequency voltage across capacitor 40 is rectified by diode 41 and filtered by a low-pass filter 46 consisting of capacitors 42 and 44 and choke coil 43. The resulting D.-C. voltage is applied to a load 45.

In the practice of my invention, larger amounts of power can be obtained for short periods of time by storing received energy in a suitable energy storage device. Stored energy may then be withdrawn at intervals at a more rapid rate than that at which it was received and put into the storage device. In this way the invention can be used to provide short pulses of relatively very high electrical energy. This result can be readily obtained by charging a relatively large capacitor with direct current and then discharging the capacitor rapidly into a load when desired. This rapid discharge can be initiated automatically when the voltage across the capacitor reaches a certain level, or it can be initiated when a transistor radio receiver receives a certain information signal.

Higher voltages can be obtained with the invention by means of well known devices for raising D.-C. voltages as shown in Figure 3. The D.-C. voltage output from the capacitor 44 can be used to power a low frequency transistor oscillator 52 whose A.-C. output is raised to a higher voltage level by the transformer 55. This relatively high A.-C. voltage can then be rectified by a diode 61 and fed to a capacitor 64 to provide a high energy D.-C. source at a relatively high voltage level at the terminals 69 and 70. If desired, energy can now be withdrawn from the capacitor 64 at intervals in short pulses of high energy at a high voltage level. Pulsed radio transmission is one of the possible uses for this form of the invention. Other uses would be to provide a single relatively powerful pulse needed to actuate an electrothermal or electromechanical device.

As has been indicated above, in many locations and particularly anywhere in or near most American cities, power signals normally present in the atmosphere are readily available for the easy and convenient practice of the invention. However, the invention also has important applications in systems in which the necessary power signal is generated and transmitted specifically for the operation of the particular system. Such systems can, for example, comprise a master station transmitting all the power that is needed for hundreds or thousands of fixed or mobile transistor receivers or other remote devices over a range of many miles. This eliminates the need for hundreds or thousands, as the case may be, of local power supplies. At the same time, such a system has the advantage that all of the remote devices can be simultaneously activated or deactivated at the will of the master station, simply by starting or stopping the transmission of the power signal. In such systems it will often be advantageous to use power signals of frequencies sufficiently high to permit the use of resonant receiving antennas of small physical dimensions for signal pickup at the remote devices. In addition to the power signal, the master station may transmit an information signal on the same or a different carrier.

Certain types of devices powered entirely by received radio waves are of course well known. The well-known "crystal set" of the early days of radio, which used a diode rectifier to demodulate an amplitude-modulated radiofrequency signal, is an outstanding example of such a device. My invention is readily distinguishable from such prior devices, however. In typical prior devices a modulated radiofrequency signal is applied to a diode to obtain unidirectional half-wave pulses whose amplitudes vary with modulation. These pulses are integrated by means of a capacitor to obtain a unidirectional signal the amplitude of which follows the audiofrequency modulation envelope. If the radiofrequency signal is received with sufficient strength the audio signal may have sufficient power to operate headphones or similar utilization device without power amplification; but the signal is utilized for its information content, rather than to supply non-information-containing power.

My invention, on the other hand, entails the utilization of received radiofrequency energy to supply power to at least one pair of circuit points (across capacitor 31 in Fig. 1, for example), such circuit points requiring power solely for its power content and not for any information or modulation it may contain. In other words, my invention entails the utilization of radiofrequency energy to supply power that would otherwise have to be supplied by batteries, generator, or other local power source.

It will be apparent that the embodiments shown are only exemplary and that various modifications can be made in construction and arrangement within the scope of the invention as defined in the appended claim.

I claim:

An electrical device for obtaining a high energy D.-C. source at a high voltage level using energy abstracted from the atmosphere, said device comprising in combination: resonant means for receiving radio waves, first rectifier means for converting said radio waves into first direct current energy, first capacitor means for storing said first direct current energy, an oscillator powered by said direct current energy, said oscillator producing an A.-C. output, transformer means for raising said A.-C. output to an increased voltage level, second rectifier means for converting the A.-C. output of increased voltage level from said transformer into second direct current energy, and second capacitor means for storing said second direct current energy.

References Cited in the file of this patent

UNITED STATES PATENTS

| | | |
|---|---|---|
| 1,540,998 | Plauson | June 9, 1925 |
| 2,056,824 | Cawley | Oct. 6, 1936 |
| 2,553,734 | Adler | May 22, 1951 |
| 2,569,687 | Pan | Oct. 2, 1951 |
| 2,647,957 | Mallinckrodt | Aug. 4, 1953 |

OTHER REFERENCES

Turner: "A crystal receiver with transistor amplifier," Radio and Television News, January 1950.